United States Patent [19]
Becker et al.

[11] Patent Number: 5,922,241
[45] Date of Patent: Jul. 13, 1999

[54] CORROSION-INHIBITED DEICING COMPOSITION BASED ON ALKALI METAL AND/OR ALKALINE EARTH METAL HALIDES, AND METHOD OF MELTING SNOW AND ICE ON TRAFFIC AREAS USING THE COMPOSITION

[75] Inventors: Wilfried Becker, Neuötting; Achim Stankowiak, Altötting, both of Germany

[73] Assignee: Clariant GmbH, Frankfurt, Germany

[21] Appl. No.: 09/009,805

[22] Filed: Jan. 21, 1998

[30] Foreign Application Priority Data

Jan. 23, 1997 [DE] Germany .............................. 197 02 242

[51] Int. Cl.⁶ ...................................................... C09K 3/18
[52] U.S. Cl. .................................................. 252/70; 106/13
[58] Field of Search .................................. 252/70; 106/13

[56] References Cited

U.S. PATENT DOCUMENTS

| 4,803,007 | 2/1989 | Garber ........................................ 252/70 |
| 5,127,954 | 7/1992 | Johnston et al. ........................... 252/70 |
| 5,350,533 | 9/1994 | Hubred et al. .............................. 252/70 |
| 5,730,895 | 3/1998 | Moore ........................................ 252/70 |

FOREIGN PATENT DOCUMENTS

| 2161522 | 7/1972 | Germany . |
| 19648716 | 12/1997 | Germany . |

OTHER PUBLICATIONS

Chemical Abstract No.89:116866. abstract of Japanese Patent No. 53–013179, May 1978.
Chemical Abstract No. 105:135712, abstract of Hungarian Patent Specification No. 37810, Feb. 1986.
Chemical Abstract No. 117:75267, abstract of Canadian Patent Specification No. 2,049,722, Feb. 1992.
Derwent Patent Family Report and/or Abstract (no date).
European Search Report (Jun. 1998).

*Primary Examiner*—Anthony Green
*Attorney, Agent, or Firm*—Susan S. Jackson

[57] ABSTRACT

The deicing composition described comprises essentially a) from 87 to 99.45% by weight of an alkali metal halide and/or an alkaline earth metal halide, b) from 0.5 to 10% by weight of an alkali metal silicate and c) from 0.05 to 3% by weight of an alkali metal phosphate. It can be employed in solid form (powder, granules and the like) or as an aqueous solution. It ensures a short thaw time and protects metals, especially steel, against corrosion.

5 Claims, No Drawings

CORROSION-INHIBITED DEICING COMPOSITION BASED ON ALKALI METAL AND/OR ALKALINE EARTH METAL HALIDES, AND METHOD OF MELTING SNOW AND ICE ON TRAFFIC AREAS USING THE COMPOSITION

DESCRIPTION

The invention relates to a corrosion-inhibited deicing composition based on alkali metal halides or alkaline earth metal halides or on a mixture thereof. The invention additionally relates to a method of melting snow and ice on traffic areas using this composition.

Snow and/or ice on roads, cycleways, footpaths, bridges, sports grounds, airfields and the like (referred to below as traffic areas) lead to a substantial impairment in the progress of the traffic and in transport safety. It has therefore long been known to apply to such areas a composition for melting or thawing snow and ice.

The prior art has described numerous alkali and alkaline earth metal salts of inorganic or organic acids as deicers, examples being the salts of hydrohalic acids, such as sodium chloride and calcium chloride, and the salts of formic acid or acetic acid, such as sodium formate, calcium formate, sodium acetate and magnesium acetate. Among these deicers, sodium chloride and calcium chloride in particular are available in large amounts, are inexpensive and are also very effective in thawing and melting ice and snow.

It is precisely these salts, however, which have a more or less strongly corrosive effect on metals such as iron, copper, aluminum, magnesium and the like, which is particularly disadvantageous with respect to modes of transport such as cars, motorbikes, aircraft and the like.

Attempts have already been made to solve the abovementioned corrosion problem by means of inhibitors. For instance, U.S. Pat. No. 4,803,007 describes, as a corrosion inhibitor for NaCl, a mixture comprising a water-soluble salt of a divalent metal and an alkali metal polyphosphate.

A highly effective inhibitor system for alkali metal halides and for alkaline earth metal halides has now been found which requires no divalent metal salts but instead consists of alkali metal salts alone, and specifically of alkali metal silicates and alkali metal phosphates each in a specific amount by weight.

The novel deicing composition comprises essentially a) from 87 to 99.45% by weight, preferably from 92 to 97.9% by weight, of an alkali metal halide and/or alkaline earth metal halide, b) from 0.5 to 10% by weight, preferably from 2 to 7% by weight, of an alkali metal silicate, and c) from 0.05 to 3% by weight, preferably from 0.1 to 1% by weight, of an alkali metal phosphate, percentages by weight being based on the composition.

Component a) is preferably an alkali metal chloride and/or alkaline earth metal chloride. The alkali metal is preferably sodium or potassium and the alkaline earth metal is preferably calcium or magnesium. Among the water-soluble alkali metal halides and alkaline earth metal halides, the former are preferred. Accordingly, component a) is preferably NaCl or $CaCl_2$ or a mixture thereof, and especially NaCl.

Component b) is a water-soluble alkali metal silicate, the alkali metal again being preferably sodium or potassium. Suitable representatives are the orthosilicates (mono-, di-, tri- and tetrabasic), disilicates to tetrasilicates, and/or the water-soluble metasilicates, which are preferred.

Component c) is a water-soluble alkali metal salt of phosphoric acid. It can be a mono-, di- or tribasic alkali metal phosphate, the alkali metal preferably being sodium or potassium.

The novel deicing composition is prepared by mixing together the liquid or solid components. Mixing of the solid components can be improved by compacting the components or by dissolving them beforehand and then subjecting them to spray drying. Therefore, the deicing composition can be employed in solid form, for example as a powder or granules, or as an aqueous solution. The amount of the three, and possibly more, judicious components in the aqueous deicing composition (overall concentration) can vary within wide limits. It depends in particular on the solubility of the components in water. The resulting solution should be essentially clear. The preferred concentration is from 25 to 60% by weight, percentages by weight being based on the weight of the solution. To obtain a high degree of frostproofing, preferred concentrations are those at or near the eutectic point. The pH of the aqueous deicing composition is generally from 7 to 10. If such a pH is not already present after mixing the components together, it is established by adding, preferably, an alkali metal hydroxide such as sodium or potassium hydroxide.

The novel method of melting snow and ice on traffic areas comprises applying an effective amount of the above-described deicing composition (in solid or liquid form) to the traffic area that is to be treated, in other words an amount such that the desired elimination of ice and/or snow is achieved. This amount depends in particular on the external temperature and on the amount of ice and/or snow present, and in general is from 10 to 100 g per $m^2$ of ice- and/or snow-covered area, this amount being based on the solids. The application of the liquid deicing composition can be carried out, for example, with the aid of the customary spraying vehicles. The solid deicing composition can be applied using customary gritting vehicles. The simultaneous deployment of liquid and solid compositions is particularly effective.

The novel deicing composition features not only a short thaw time but also an unexpectedly high level of inhibition of metallic corrosion, especially the corrosion of steel. This results apparently from the combination of the abovementioned phosphates and silicates, each in a defined amount, and from the fact that this inhibitor system is highly effective specifically in the case of alkali metal halides and/or alkaline earth metal halides.

The invention will now be illustrated in more detail with reference to novel examples and comparative examples.

The deicing compositions of novel Examples 1 to 4 and of Comparative Examples 1 to 4 below were prepared by mixing the components. The stated percentages for the individual components are percentages by weight.

EXAMPLES

The deicing compositions of Examples 1 to 4 and of the comparative experiments 1 to 4 are tested for steel corrosion. The tests are in accordance with ASTM F 483 (ASTM= American Society for Testing and Materials). The weighed test specimen is in each case a ground and polished steel plate measuring 2.5×5.0×0.1 cm (steel C 45, corresponding to C 4130 Mil-S-18729). The test specimen is placed in the test deicing composition so as to be completely immersed. The temperature of the test setup is maintained at 35° C. After fixed intervals, the test specimen is removed, brushed in accordance with ASTM F 483, washed and dried and then weighed. The change in weight, generally a minus figure, is indicated in the examples by mg/cm² per 24 hours. In addition, the test specimens are also assessed visually.

Example 1

| | |
|---|---|
| 5.0 g | of sodium chloride |
| 0.2 g | of sodium metasilicate |
| 0.02 g | of tripotassium orthophosphate |
| 94.78 ml | of water |

Example 2

| | |
|---|---|
| 15.0 g | of sodium chloride |
| 0.5 g | of potassium metasilicate |
| 0.06 g | of tripotassium orthophosphate |
| 84.44 ml | of water |

Example 3

| | |
|---|---|
| 25.0 g | of calcium chloride |
| 1.0 g | of potassium metasilicate |
| 0.5 g | of trisodium orthophosphate |
| 73.5 ml | of water |

Example 4

| | |
|---|---|
| 50.0 g | of calcium chloride |
| 2.2 g | of sodium metasilicate |
| 0.8 g | of tripotassium orthophosphate |
| 47.0 ml | of water |

Comparative Example 1 (no inhibitors)

| | |
|---|---|
| 5.0 g | of sodium chloride |
| 95.0 ml | of water |

Comparative Example 2 (no inhibitors)

| | |
|---|---|
| 15.0 g | of sodium chloride |
| 85.0 ml | of water |

Comparative Example 3 (no inhibitors)

| | |
|---|---|
| 25.0 g | of calcium chloride |
| 5.0 ml | of water |

Comparative Example 4 (no inhibitors)

| | |
|---|---|
| 50.0 g | of calcium chloride |
| 50.0 ml | of water |

The results of the steel corrosion tests with and without inhibition are summarized in the table below. The erosion figures given are in each case the mean of two identical series of experiments. The test specimens from Examples 1 to 4 showed only tarnishing but no rust whatsoever. In contrast, rust formation with the noninhibited NaCl solutions was rapid, and with noninhibited $CaCl_2$ solutions it was slower.

| | Erosion [mg/cm²] after | | | |
|---|---|---|---|---|
| Example | 7 days | 14 days | 28 days | Visual assessment |
| 1 | −0.014 | −0.011 | −0.0055 | no rust |
| 2 | −0.001 | −0.001 | −0.001 | no rust |
| 3 | −0.022 | −0.023 | −0.020 | no rust |
| 4 | −0.001 | −0.004 | −0.004 | no rust |
| Comparative Example | | | | |
| 1 | −0.111 | −0.111 | −0.116 | rust after 2 days |
| 2 | −0.066 | −0.065 | −0.067 | rust after 2 days |
| 3 | −0.019 | −0.030 | −0.041 | rust after 8 days |
| 4 | −0.002 | −0.004 | −0.005 | beginning of rust after 10 days |

We claim:
1. A deicing composition consisting of
   a) from 87 to 99.45% by weight of an alkali metal halide and/or an alkaline earth metal halide,
   b) from 0.5 to 10% by weight of an alkali metal silicate, and
   c) from 0.05 to 3% by weight of an alkali metal phosphate.
2. The deicing composition as claimed in claim 1, consisting of
   a) from 92 to 97.9% by weight of an alkali metal halide and/or an alkaline earth metal halide,
   b) from 2 to 7% by weight of an alkali metal silicate, and
   c) from 0.1 to 1% by weight of an alkali metal phosphate.
3. The deicing composition as claimed in claim 1, wherein component a) is sodium chloride or calcium chloride or a mixture thereof, component b) is an alkali metal metasilicate and component c) is a mono-, di- or tribasic alkali metal phosphate.
4. The deicing composition as claimed in claim 1, wherein component a) is sodium chloride, component b) is an alkali metal metasilicate and component c) is a mono-, di- or tribasic alkali metal phosphate.
5. A method of melting ice and snow on traffic areas, which comprises applying an effective amount to melt snow and ice of the deicing composition as claimed in claim 1 in solid form or in the form of an aqueous solution to the traffic areas.

* * * * *